April 12, 1960  C. A. HATHAWAY  2,932,445
CENTRIFUGAL BLOWER WHEEL AND METHOD OF MAKING
Filed June 20, 1957  2 Sheets-Sheet 1
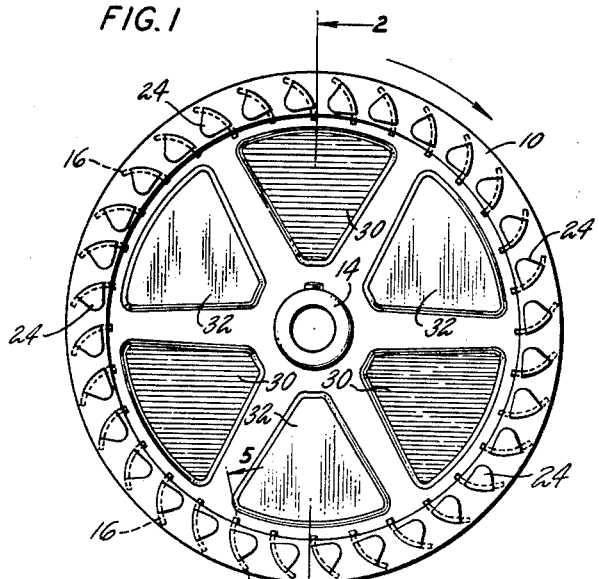
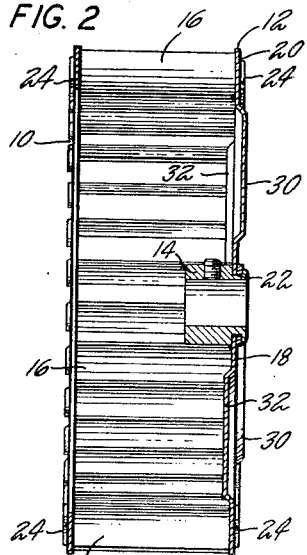
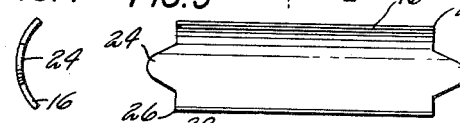
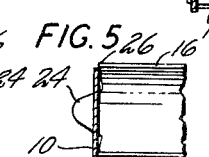
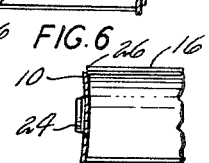
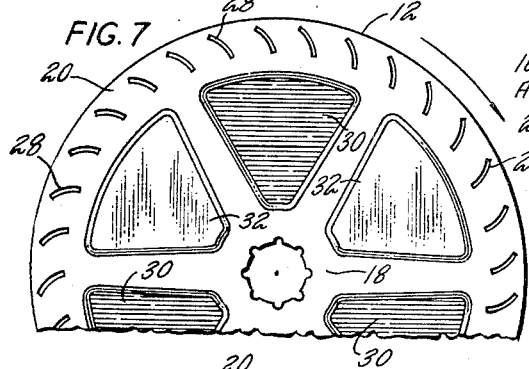
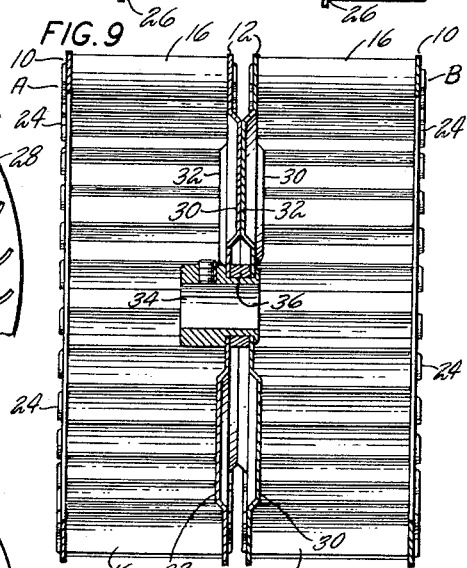
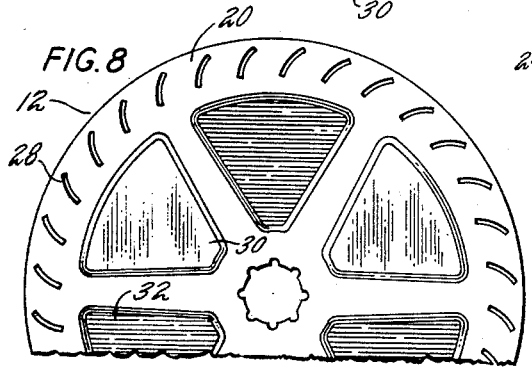
INVENTOR
CHARLES A. HATHAWAY
BY Teller & McCormick
ATTORNEYS April 12, 1960 — C. A. HATHAWAY — 2,932,445
CENTRIFUGAL BLOWER WHEEL AND METHOD OF MAKING
Filed June 20, 1957 — 2 Sheets-Sheet 2
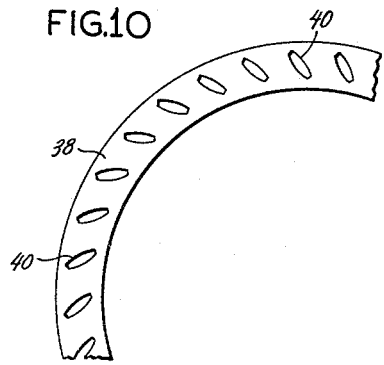
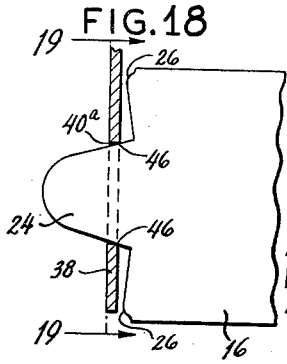
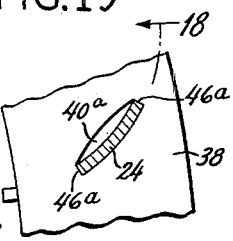
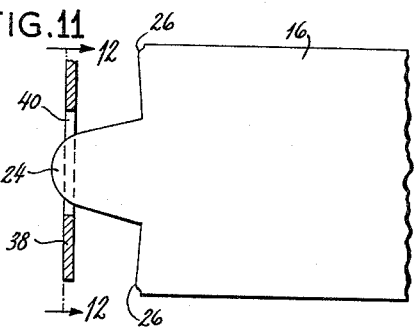
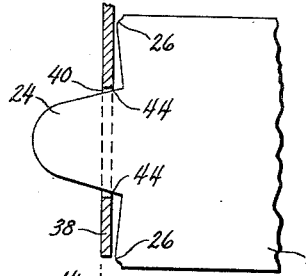
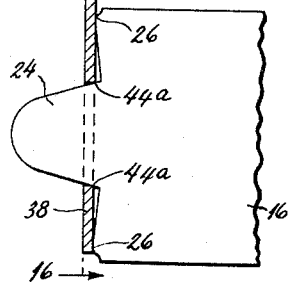
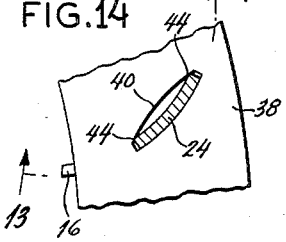
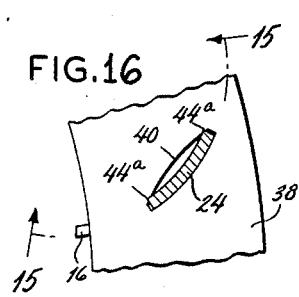
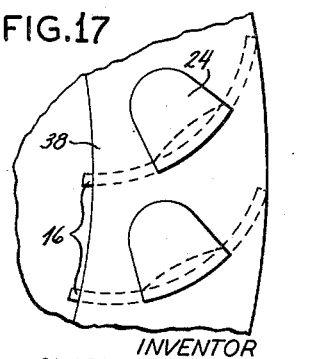
INVENTOR
CHARLES A. HATHAWAY
BY Teller & McCormick
ATTORNEYS is impracticable to provide and use a fixture that would hold the several blades in an absolutely accurate spaced relationship, and in accordance with the present invention it is entirely satisfactory for the fixture to hold the blades in an approximation of the theoretically correct spacing. Notwithstanding a considerable variation in spacing, both circumaxially and radially, as shown in Fig. 12 the outer portions of the tabs 24, 24 on the several blades 16, 16 will enter the slots 40, 40 which are relatively wide at the central portions thereof.

As the end ring moves longitudinally from the position shown in Figs. 11 and 12 to the position shown in Figs. 13 and 14, the longitudinally converging sides of the tabs 24, 24 engage the transversely converging edges of the slots 40, 40. The result is that the several tabs are moved circumaxially or radially or both to the extent necessary to bring the blades into accurately spaced relationship. It may be desirable to stamp or coin the tabs of the blades at the ends of said tabs so that the end portions are slightly reduced in thickness. This reduction in tab thickness assists in assembly.

Preferably, each of said slots 40, 40 in the end ring and in the end plate has at least one dimension that is initially slightly less than the immediately adjacent corresponding initial dimension of the tab 24 when fully entered in said slot. As the result of the foregoing the tab can be fully entered in the slot only by the application of pressure. When pressure is applied to effect complete assembly there is interdeformation between the tab and the walls of the slot, one or the other or both of said parts being deformed. Otherwise stated, there is a crushing engagement between said tab and said slot walls. The result is that there is a very firm gripping of the tab within the slot.

As specifically illustrated in Figs. 11 to 16, the width of each slot 40 at the ends of said slot and more particularly at the edges of the base of the tab 24 is slightly less than the thickness of said tab. The width of each tab measured along the arc thereof is slightly less than the length of the slot when similarly measured. It may be assumed, that at the position of the ring shown in Figs. 13 and 14, the edges of the slots have moved into firm engagement with the edges of the tabs at the points 44, 44. It will be observed that the engagement points 44, 44 are spaced from the ends of the slot as clearly shown in Fig. 14.

By the application of considerable pressure the ring 38 is moved longitudinally from the position shown in Figs. 13 and 14 to the position shown in Figs. 15 and 16 at which last said position the ring engages the outer corners 26, 26 of the blades. Pressure is required for the last-mentioned movement because the ring was already in direct contact with the tabs at the points 44, 44 as previously stated. Upon movement of the ring as above stated and as the result of the described dimensional relationship, there is interdeformation between the tab and the walls of the slot. As shown, the corners of each tab 24 bite into or deform the edges of the corresponding slot 40 at 44ª, 44ª, and there is definite assurance of very firm engagement between said ring and said blades.

In order to retain the last-mentioned firm engagement between the ring and the blades, the tabs 24, 24 are folded over as shown in Fig. 17. The action is exactly the same as described in connection with Figs. 5 and 6. The end ring is made slightly concave.

The described procedure for connecting the blades with the end ring is used, except for reversal, for connecting the blades with the end plate. Repetition of the description is unnecessary.

From the foregoing description relating to Figs. 10 to 17 it will be apparent that a set of companion blanks has been provided for making a centrifugal blower wheel which is rotatable about a central longitudinal axis. The set of blanks comprises a plurality of sheet metal blades 16, 16 such as have been fully shown and described and said set of blanks also comprises two forward and rearward circular sheet metal end members such as have been fully shown and described and which may be an end ring and an end plate.

Also from the foregoing description relating to Figs. 10 to 17, it will be apparent that there has been disclosed a method for making a centrifugal blower wheel which is rotatable about a central longitudinal axis. Said method comprises the provision of an annular series of sheet metal blades 16, 16 such as have been fully shown and described and further comprises the provision of two sheet metal end members such as have been fully shown and described and which are spaced forwardly and rearwardly from the blades. The method further includes effecting relative longitudinal movement between the blades and the end members to cause the tabs on the blades to enter the slots in the end members with the results that have been fully set forth. Additionally, the method includes the bending of the tabs on said blades after the completion of said relative longitudinal movement so as to securely connect said blades with said end members.

Another alternative detail is shown in Figs. 18 and 19 which are similar respectively to Figs. 13 and 16. The ring 38 has slots 40ª each of which at the ends thereof may be at least as large as the thickness of the tab 24 and the width of each tab measured along the arc thereof may be slightly greater than the length of the slot 40ª when similarly measured. At the position shown in Fig. 18 the edges of the tab 24 have engaged the ends of the slot 40ª at 46, 46. By reason of the tab taper, further movement of the end ring relatively to the tab serves to deform the metal of the tab or of the ring or of both at said points 46, 46, the deformation being shown at 46ª, 46ª in Fig. 19. Such further movement requires considerable pressure and there is definite assurance of very firm engagement between said ring and said blades.

The invention claimed is:

1. A centrifugal blower wheel rotatable about a central axis and comprising in combination, an annular series of separate blades uniformly spaced circumaxially and each having tabs at its forward and rearward ends, a forward sheet metal end ring having near its periphery a series of slots which receive and at least partly fit the tabs at the forward ends of the blades which tabs are bent and are in engagement with the front face of the ring and which tabs securely connect the blades with the ring, and a sheet metal end plate having a central aperture adapted to receive and fit a portion of a hub and provided with a substantially flat inner annular portion surrounding said aperture and also provided with a substantially flat outer annular portion having a series of slots which receive and at least partly fit the tabs at the rearward ends of the blades which tabs are bent and are in engagement with the rear face of said outer annular portion of the plate and which tabs securely connect the blades with the plate, said end plate being shaped to provide a plurality of similar circumaxially spaced rearwardly projecting integral panels located between said annular portions and having their rearward faces in a single plane perpendicular to said central axis and spaced rearwardly from a transverse plane through the rear faces of the bent rearward tabs of the blades.

2. A centrifugal blower wheel rotatable about a central axis and comprising a forward sheet metal end ring and a sheet metal end plate spaced longitudinally rearwardly from said end ring and said blower wheel also comprising a central hub supporting said end plate and projecting therethrough and further comprising an annular series of similar sheet metal blades extending between said ring and said plate and each provided at its ends with tabs narrower than the blade body and joined thereto at their bases and each having corner portions at each end projecting longitudinally beyond the corresponding tab base, said end ring and an annular portion of said end plate being each provided with slots which receive and at least partly fit the corresponding blade tabs which tabs are bent and are in engagement with the outer faces of said ring and said plate, said ring and plate being firmly connected with the blades as the result of their engagement with said bent blade tabs and with said projecting blade corner portions.

3. A centrifugal blower wheel as set forth in claim 2 wherein said end ring and said annular portion of said end plate are slightly concave at said blade tabs as the result of the engagement of said ring and said plate portion with said tabs and with said projecting blade corner portions.

4. A centrifugal blower wheel as set forth in claim 3, wherein each slot in said end ring and in said annular portion of said end plate has concave and convex sides and closely fits the corresponding blade tab at both sides thereof.

5. A circular sheet metal end plate for a centrifugal blower wheel movable to a first position for use as a component part of a blower wheel adapted for rotation in one direction or movable to a reversed position for use as a component part of an alternative blower wheel adapted for rotation in the opposite direction, said plate being centrally apertured to receive and fit a hub and being provided with substantially flat inner and outer annular portions in the same main plane the latter of which portions has inclined slots adapted for receiving portions of longitudinal blades which are inclined in one direction or in an opposite direction according to the location of the plate in its first position or in its reversed position, and said plate being provided with an even plurality of at least four projecting panels between said annular portions which panels are so arranged that alternate first panels project in one direction from said main plane with their projecting faces in a common plane which is adapted to be the rearmost plane of a blower adapted for rotation in the said first direction and which panels are further so arranged that the intervening second panels project to the same extent in the opposite direction from said main plane with their projecting faces in a second common plane which is adapted to be the rearmost plane of a blower wheel adapted for rotation in said opposite direction.

6. A duplex blower wheel unit rotatable about a central axis and consisting of a hub and two blower wheels oppositely positioned in back-to-back relationship and each comprising an outer end ring and an inner end plate which is formed and shaped as set forth in claim 5 and is spaced longitudinally inwardly from said end ring and each blower wheel also comprising an annular series of similar blades rigidly connected at their ends to said end ring and to said end plate, said end plates of the two wheels being identical in size and shape and each of them being centrally apertured to receive and fit said hub and said end plates of the two wheels being reversely positioned relatively to their respective end rings so that the first panels of one plate engage with the second panels of the other plate.

7. A centrifugal blower wheel rotatable about a central axis and comprising in combination, an annular series of separate blades uniformly spaced circumaxially and each having tabs at its forward and rearward ends each of which tabs at its base is narrower than the body of the blade and has sides which converge longitudinally from said body, a forward sheet metal end ring having near its periphery a series of slots which receive the tabs at the forward ends of the blades, and a sheet metal end plate provided with a substantially flat outer annular portion having a series of slots which receive the tabs at the rearward ends of the blades, said slots in the end ring and in the end plate having their central portions wider than their end portions so that notwithstanding variations in blade spacing prior to assembly the narrower outer portions of the forward tabs of the several blades may be simultaneously entered during assembly in the slots in the end ring and so that the narrower outer portions of the rearward tabs of the several blades may be simultaneously entered during assembly in the slots in said end plate, and said tabs on said blades after assembly being in engagement with the front face of the end ring and the rear face of said outer annular portion of the end plate so as to securely connect the blades with said ring and plate.

8. An end member for a blower wheel rotatable about a central axis and having an annular series of separate blades uniformly spaced circumaxially and each formed with bendable tabs at its ends and each of which tabs at its base is narrower than the body of the blade and has sides which converge longitudinally from said body, said end member including a flat sheet metal portion having near its periphery an annular series of slots uniformly spaced around a central axis and adapted to receive blade tabs, each of said slots being inclined with respect to a radius and each of said slots having two opposite concave arcuate walls.

9. A centrifugal blower wheel rotatable about a central axis and comprising in combination, an annular series of separate blades uniformly spaced circumaxially and each formed with tabs at its forward and rearward ends each of which tabs at its base is narrower than the body of the blade and has sides which converge in the direction away from said body, a forward sheet metal end ring having near its periphery a series of slots which receive the tabs at the forward ends of the blades, and a sheet metal end plate provided with a substantially flat outer annular portion having a series of slots which receive the tabs at the rearward ends of the blades, said slots in the end ring and in the end plate having their central portions wider than their end portions and each of said slots having at least one dimension that is initially slightly less than the immediately corresponding initial dimension of the corresponding tab when fully entered in said slot so that upon complete assembly there has been interdeformation between the tab and the slot walls with resultant firm gripping of said tab within said slot, said tabs on said blades being in engagement respectively with the front face of the end ring and with the rear face of said outer annular portion of the end plate so as to securely connect the blades with said ring and plate.

10. A centrifugal blower wheel as set forth in claim 9, wherein each of said blades has corner portions at each end projecting longitudinally beyond the corresponding tab base, wherein said end ring and said annular portion of said end plate are slightly concave at said blade tabs as the result of the engagement of said ring and said plate portion with said tabs and with said projecting blade corner portions.

11. A centrifugal blower wheel as set forth in claim 9, wherein the walls of each slot in the end ring and in the end plate are arcuate and concave and converge toward the end of said slot, and wherein the initial width of each slot at the edges of the base of the tab is slightly less than the initial thickness of the tab so that upon complete assembly there has been interdeformation between the corners of the tab and the walls of the slot.

12. A centrifugal blower wheel as set forth in claim 9, wherein the walls of each slot in the end ring and in the end plate are arcuate and concave and converge toward the end of said slot, and wherein the initial length of the slot as measured along an arcuate wall is slightly less than the similarly measured width of a blade tab so that upon complete assembly there has been interdeformation between the edges of the tab and the end walls of the slot.

13. A set of companion blanks for making a centrifugal blower wheel which is rotatable about a central longitudinal axis, said set of blanks comprising in combination, a plurality of similar sheet metal blades adapted to be

United States Patent Office 2,932,445
Patented Apr. 12, 1960

2,932,445

CENTRIFUGAL BLOWER WHEEL AND METHOD OF MAKING

Charles A. Hathaway, Litchfield, Conn., assignor to The Torrington Manufacturing Company, Torrington, Conn., a corporation of Connecticut Application June 20, 1957, Serial No. 666,847

16 Claims. (Cl. 230—134)

This application is a continuation-in-part of my co-pending application Ser. No. 608,801, filed September 10, 1956, and now abandoned, entitled Centrifugal Blower Wheel.

The invention relates to centrifugal blower wheels and more particularly to such wheels comprising sheet metal parts. A blower wheel of the type to which the invention relates includes an end ring and an end plate and an annular series of separate or individual blades rigidly connected at their ends to said ring and to said plate.

The general object of the invention is to provide a blower wheel of the type specified which is simple, strong and inexpensive.

A more specific object of the invention is to provide a blower wheel of the type set forth having improved means for rigidly connecting the blades with the end ring and the end plate.

Another more specific object of the invention is to provide a blower wheel of the type set forth including an improved end plate having increased strength and having other advantages.

A further more specific object of the invention is to provide an end plate having the before-stated advantages of the invention and further adapted for use without change either for a blower wheel adapted for rotation in one direction or for a blower wheel adapted for rotation in the opposite direction.

Another object of the invention is to provide a set of parts particularly related to each other as to size and shape and adapted to be assembled in an advantageous manner to make a blower wheel.

Still another object of the invention is to provide an advantageous method for making a blower wheel.

The drawings show three suitable embodiments of the invention and such embodiments will be described, but it will be understood that various changes may be made from the constructions and method disclosed, and that the drawings and description are not to be construed as defining or limiting the scope of the invention, the claims forming a part of this specification being relied upon for that purpose.

Of the drawings:

Fig. 1 is an end view of a blower wheel embodying the invention, this view being taken from the left in relation to Fig. 2.

Fig. 2 is a longitudinal sectional view taken along the line 2—2 of Fig. 1.

Fig. 3 is an enlarged fragmentary view of an individual blade.

Fig. 4 is an end view of the blade shown in Fig. 3.

Fig. 5 is an enlarged fragmentary sectional view taken along the line 5—5 of Fig. 1, but showing the parts in an intermediate relationship of assembly.

Fig. 6 is a view similar to Fig. 5, but showing the parts in their final assembled relationship.

Fig. 7 is an enlarged face view of a portion of the end plate, this view being taken in the same direction as Fig. 1.

Fig. 8 is a view similar to Fig. 7 but showing the end plate in reversed or inverted position.

Fig. 9 is a view similar to Fig. 1 but showing two blower wheels carried by a single hub.

Fig. 10 is a fragmentary view showing a portion of the end ring of an alternative blower wheel.

Fig. 11 is a developed sectional view taken along the line 11—11 of Fig. 12 and showing a portion of the end ring of the alternative blower wheel positioned with the tab on one of the blades entered in one of the slots therein.

Fig. 12 is a view taken along the line 12—12 of Fig. 11 and showing a series of slots and a series of blade tabs.

Fig. 13 is a view similar to Fig. 11 but taken along the line 13—13 of Fig. 14 and showing the end ring advanced so that the blade tab is more fully entered in the slot.

Fig. 14 is a view taken along the line 14—14 of Fig. 13 and showing one slot and one blade tab on a considerably enlarged scale.

Fig. 15 is a view similar to Fig. 13 but taken along the line 15—15 of Fig. 16 and showing the end ring farther advanced so that the blade tab is almost completely entered in the slot.

Fig. 16 is a view similar to Fig. 14 but taken along the line 16—16 of Fig. 15.

Fig. 17 is an enlarged fragmentary view similar to a portion of Fig. 1 but showing two of the blade tabs in their final positions.

Fig. 18 is a view similar to Fig. 13 but showing a detail of another alternative blower wheel, this view being taken along the line 18—18 of Fig. 19.

Fig. 19 is a view similar to Fig. 16 but showing the last said alternative detail, this view being taken substantially along the line 19—19 of Fig. 18.

The blower wheel as shown in the drawing comprises a forward end ring 10, an end plate 12 spaced longitudinally rearwardly from said end ring 10 and supported by a central hub 14, and an annular series of similar separate or individual blades 16, 16 rigidly connected at their ends to said ring 10 and to said plate 12. The blower wheel is rotatable about a central longitudinal axis.

Said end plate 12 is formed of sheet metal and has a main body centrally apertured to receive and fit said hub 14. The said main body is provided with an inner annular portion 18 surrounding the hub 14 and is provided with a peripheral annular portion 20 to which said individual blades 16, 16 are attached. The hub 14 preferably has an end portion of reduced diameter 22, and the aperture in the end plate 12 receives and fits said reduced portion. The reduced portion 22 of the hub initially projects rearwardly. When the hub and plate are assembled, said projecting reduced portion is spun over to the position shown in Fig. 2, the hub and the plate being thus rigidly connected with each other.

Referring particularly to Figs. 3 and 4, each blade 16 is of uniform width throughout its effective portion and is curved transversely. Each blade is provided at its ends with similar tabs 24, 24 narrower than the said effective portion or body of the blade and joined thereto at their bases, said tabs being adapted to be folded or bent along transverse bending lines. Preferably the blade 16 has corner portions 26, 26 which project longitudinally beyond the bases of the corresponding tabs. As shown, said projecting corner portions 26, 26 result from inclined end faces on the blades as shown in Fig. 3.

The end ring 10 and the annular portion 20 of the end plate are each provided with an annular series of slots 28, 28 corresponding in spacing to the spacing of the blades 16, 16. The slots 28, 28 for the end plate 12 are shown in Fig. 7 and the slots for the end ring 10 are similar. Said slots 28, 28 may be of such size and shape as to receive and closely fit the blade tabs 24, 24, and they are so shown. Said slots 28, 28 are so inclined that the blades are held at the correct angles. In assembly the tabs 24, 24 are entered in the slots 28, 28 and are then bent over to the positions shown in Figs. 1 and 2 wherein they engage the faces of the ring and the plate. Thus the blades are firmly connected to said ring and plate. As hereinafter more fully explained, the slots may be inclined in either direction for clockwise or counterclockwise rotation of the wheel.

The projecting corner portions 26, 26 of the blades provide a firmer connection with the ring and plate than would otherwise be possible. As more clearly shown in Fig. 5, the inside faces of the ring and plate initially contact with the blades only at said corner portions, the tabs being subsequently bent over to engage the outside faces of the ring and plate as shown in Fig. 6. Said ring and plate are firmly connected with the blades as the result of the engagement thereof with said bent blade tabs and with said projecting blade corner portions. Preferably and as shown in Fig. 6, the bending of the blade tabs 24, 24 serves to slightly distort the ring 10 so that it is slightly concave at said tabs and it will be understood that the tabs 24, 24 at the opposite ends of the blades serve to similarly distort the peripheral annular portion 20 of the plate 12. The end ring and the end plate are resilient and tend to return to their flat shapes, and the said distortion therefore serves to ensure the firm and rigid connection between said blades and said ring and plate. The angles at the ends of the blade 16 and the distortion of the ring 10 are exaggerated in Figs. 5 and 6.

The end plate 12 is shaped to provide a plurality of similar rearwardly projecting integral panels 30, 30 between said annular portions 18 and 20, said panels being equally spaced circumaxially. Preferably the panels 30, 30 have their rearward faces in a single plane perpendicular to the axis of rotation and this plane is spaced rearwardly from the plane of the rear ends of the blade tabs 26, 26.

Preferably there are three or more panels 30, 30 and in any event there are at least two panels. Said panels are spaced apart and the plate is additionally shaped to provide the same number of similar panels 32, 32 which are between said panels 30, 30. The panels 32, 32 are preferably exactly like the panels 30, 30 except that they project oppositely. When the panels 30, 30 project rearwardly as shown in Fig. 2 and as described, the panels 32, 32 project forwardly. The panels 32, 32 have their forward faces in a single plane perpendicular to the axis of rotation. The several panels 30, 30 and 32, 32 are alternately positioned and uniformly spaced. When oppositely projecting panels are provided, there is an even plurality of four or more such panels.

Said panels 30, 30 and 32, 32 make the plate 12 very rigid and resistant to distortion. The rigid rear plate 12 and the rigid connection of the blades 16 with said plate 12 and with said end ring 10 make the entire blower wheel very rigid.

Said panels 30, 30 and 32, 32 not only provide strength and rigidity in the end plate, but those panels that project rearwardly provide abutments for engaging another similar wheel in back-to-back relationship. As shown in Figs. 1 and 2, the panels 30, 30 are the ones that project rearwardly and are adapted for engagement with oppositely projecting panels on a similar oppositely positioned wheel.

In manufacturing, provision must be made for blower wheels adapted for clockwise rotation as shown in Fig. 1 and also for blower wheels adapted for counterclockwise rotation. This might be effected by providing end plates of two different varieties, one having the slots 28, 28 inclined as in Figs. 1 and 7 for clockwise rotation and the other having similar slots oppositely inclined for counterclockwise rotation. However, manufacturing is greatly simplified by providing a single variety of end plates which can be merely reversed or inverted to provide for rotation in one direction or the other as required. The end plate 12 as described is reversible for the stated purpose. Fig. 7 shows the end plate 12 in the position that it occupies in a wheel adapted for clockwise rotation as shown in Fig. 1, the panels 30, 30 being the rearwardly projecting panels. Fig. 8 shows the same end plate 12 in the reversed or inverted position which it occupies in a wheel adapted for counterclockwise rotation, the panels 32, 32 now being the rearwardly projecting panels. In either position the plate has rearwardly projecting panels adapted for engagement with the panels on the end plate of a similar wheel. For clarity the rearwardly projecting panels are horizontally shaped in Figs. 7 and 8 to distinguish them from the forwardly projecting panels.

Fig. 9 shows two wheels A and B assembled in back-to-back relationship and connected to a common hub 34, said two blower wheels constituting a duplex unit. The two end rings 10, 10 are at the outer ends of the respective wheels and the two end plates 12, 12 are at the inner ends of the respective wheels and are in engagement at the projecting panels 30, 30 of wheel A and at the panels 32, 32 of wheel B. The central portions of the two end plates 12, 12 are held in spaced relationship by a spacing ring 36.

Except for the hub, the wheel A is exactly like the wheel shown in Figs. 1 and 2 and is adapted for clockwise rotation as viewed from the left. The two wheels rotate in unison, and the wheel B therefore rotates in the clockwise direction as viewed from the left, but in the counterclockwise direction as viewed from the right. For purposes of initial manufacture the wheel B can be regarded as counterclockwise and the end plate 12 thereof must be in reversed relationship with the blades and end ring thereof. As the result of this reversed relationship of the wheel B it is the panels 32, 32 that project and not the panels 30, 30. Fig. 7 shows the end plate 12 in the position for receiving blades from the front to make the clockwise wheel A. Fig. 8 shows the end plate in the position for receiving blades from the front to make the counterclockwise wheel B. As the result of the relatively reversed position of the end plate of the wheel B, the projecting panels of the two plates interengage. The panels 30, 30 on the plate of wheel A engage the panels 32, 32 on the plate of wheel B.

Figs. 10 to 17 show a portion of an alternative blower wheel which is similar to that shown in Figs. 1 to 8 except as to the means for connecting the individual blades with the end plate and with the end ring. Only the connection with the end ring is shown, but the connection with the end plate is identical except for reversal. The blade 16 is shown in Fig. 11 as having its corner portions 26, 26 slightly spaced from the blade edges.

The end ring 38 shown in Fig. 10 is or may be exactly like the end ring 10 shown in Fig. 1 except that the slots 40, 40 in said end ring 38 are different in shape although similar as to general locations and spacing. The slots in said end ring 10 are like those in the end plate 20 as shown in Fig. 7, and each slot has concave and convex edges so that it is adapted to almost exactly conform in shape to the curved shape of the corresponding blade tab 24, one blade tab being shown in Fig. 4. In contrast, each slot 40 in said alternative end ring 38 has opposed concave edges so that the slot is adapted to conform to the curvature of the tab 24 at only the convex side of said tab.

As indicated in Figs. 11 and 12, all of the blades 16, 16 may be simultaneously assembled with the end ring 38 by relative longitudinal movement between said blades and said ring. It may be assumed that the ring 38 is moved longitudinally while the blades 16, 16 are held stationary by means of a suitable fixture, not shown. It arranged longitudinally in an annular series and approximately uniformly spaced circumaxially, each blade having bendable tabs respectively at its forward and rearward ends each of which tabs at its base is narrower than the body of the blade and each of which tabs has sides which converge longitudinally from said body, and two forward and rearward circular sheet metal end members each having near its periphery a plurality of slots corresponding to the plurality of blades which slots are exactly uniformly spaced circumaxially in an annular series and are shaped to fit the corresponding blade tabs at one side thereof, said slots in each of the end members having their central portions substantially wider than their end portions so as to facilitate entry of the blade tabs during relative longitudinal assembly movement and said slots having their lengths approximately equal to the widths of the blade tabs at the bases thereof so as to accurately locate the blades relatively to the end members when the tabs are fully entered in the slots.

14. A set of companion blanks as set forth in claim 13, wherein each of said slots in said end members has at least one dimension that is initially slightly less than the immediately corresponding initial dimension of the corresponding tab when fully entered in said slot so that upon complete assembly there is interdeformation between the tab and the slot walls with resultant firm gripping of said tab within said slot.

15. A method for making a centrifugal blower wheel which is rotatable about a central longitudinal axis, which method comprises: providing an annular series of separate longitudinal sheet metal blades approximately uniformly spaced circumaxially and each having bendable tabs respectively at its forward end and rearward ends each of which tabs at its base is narrower than the body of the blade and each of which tabs has sides which converge longitudinally from said body, providing two sheet metal end members spaced respectively forwardly and rearwardly from the blades each of which end members has near its periphery a plurality of slots exactly uniformly spaced circumaxially in an annular series and so spaced as to longitudinally register with the tabs at the forward and rearward ends of the blades of said annular series which slots in the end members have greater widths at their central portions than at their end portions and which slots have their lengths approximately equal to the widths of the blade tabs at the bases thereof, effecting relative longitudinal movement between the blades and the end members to cause the tabs on the blades to enter the slots in the end members so that the greater widths of the slots at their central portions enable the narrower end portions of the tabs of the several blades to simultaneously enter said slots notwithstanding any variations in the initial blade spacing and so that the end portions of the slots engage the edges of the tabs near the bases thereof to effect exact uniformity of blade spacing when said tabs are approximately fully entered, and bending said tabs on said blades after said relative longitudinal movement to bring them respectively into engagement with the front and rear faces of the end members at said annular portions thereof so as to securely connect said blades with said end members.

16. A method as set forth in claim 15, wherein each of said slots in said end members has at least one dimension that is initially slightly less than the immediately corresponding initial dimension of the corresponding tab when fully entered in said slot so that upon complete assembly there is interdeformation between the tab and the slot walls with resultant firm gripping of said tab within said slot.

References Cited in the file of this patent

UNITED STATES PATENTS

| | | |
|---|---|---|
| 1,602,009 | Germeyer | Oct. 5, 1926 |
| 1,636,652 | Ness | Aug. 2, 1927 |
| 1,811,916 | Carter | June 30, 1931 |
| 1,890,226 | Mathis | Dec. 6, 1932 |
| 1,995,907 | Stoll | Mar. 26, 1935 |
| 2,209,028 | Kortz | July 23, 1940 |
| 2,272,695 | Evans | Feb. 10, 1942 |
| 2,299,010 | Doman | Oct. 13, 1942 |
| 2,302,095 | Bartch | Nov. 17, 1942 |
| 2,315,407 | Evans | Mar. 30, 1943 |
| 2,450,186 | Curry | Sept. 28, 1948 |
| 2,628,419 | Wilken | Feb. 17, 1953 |
| 2,711,285 | Burrowes | June 21, 1955 |
| 2,745,171 | King et al. | May 15, 1956 |
| 2,749,026 | Hasbrouck et al. | June 5, 1956 |
| 2,752,859 | Zeidler | July 3, 1956 |
| 2,771,241 | Sprouse | Nov. 20, 1956 |

FOREIGN PATENTS

| | | |
|---|---|---|
| 537,727 | Great Britain | July 3, 1941 |
| 580,119 | Great Britain | Aug. 27, 1946 |